(12) United States Patent
Park et al.

(10) Patent No.: US 10,138,905 B2
(45) Date of Patent: Nov. 27, 2018

(54) WASHER PUMP APPARATUS FOR VEHICLE PROVIDED WITH IMPROVED WATER-PROOF STRUCTURE

(71) Applicant: DY AUTO Corporation, Asan-si, Chungcheongnam-do (KR)

(72) Inventors: Wi Yeong Park, Incheon (KR); Jong Wook Lee, Incheon (KR); Sung Jun Yoon, Incheon (KR)

(73) Assignee: DY AUTO Corporation, Asan-si (KR)

( * ) Notice: Subject to any disclaimer, the term of this patent is extended or adjusted under 35 U.S.C. 154(b) by 578 days.

(21) Appl. No.: 14/869,839

(22) Filed: Sep. 29, 2015

(65) Prior Publication Data
US 2016/0146225 A1 May 26, 2016

(30) Foreign Application Priority Data
Nov. 20, 2014 (KR) .................. 10-2014-0162600

(51) Int. Cl.
*F04D 29/58* (2006.01)
*F04D 29/70* (2006.01)
(Continued)

(52) U.S. Cl.
CPC .......... *F04D 29/706* (2013.01); *F04D 13/06* (2013.01); *F04D 13/08* (2013.01);
(Continued)

(58) Field of Classification Search
CPC ............ F04D 13/0606; F04D 13/0613; F04D 13/0633; F04D 13/06; F04D 13/08;
(Continued)

(56) References Cited

U.S. PATENT DOCUMENTS

| 4,732,537 A * | 3/1988 | Kusz ................. F04D 13/04 415/202 |
| 6,293,769 B1 * | 9/2001 | Radermacher ......... F04D 13/06 417/357 |
| 6,460,738 B1 * | 10/2002 | Petit .................. B05B 11/0016 222/189.09 |

FOREIGN PATENT DOCUMENTS

| CN | 202152761 U | 2/2012 |
| EP | 1 441 431 A1 | 7/2004 |

(Continued)

OTHER PUBLICATIONS

State Intellectual Property Office of the People's Republic of China, Office Action, dated Jul. 4, 2017, issued in China Patent Application No. 20151077159.4.
(Continued)

*Primary Examiner* — Richard A Edgar
*Assistant Examiner* — Danielle M Christensen
(74) *Attorney, Agent, or Firm* — Klarquist Sparkman, LLP

(57) ABSTRACT

Provided is a washer pump apparatus for a vehicle, the washer pump apparatus having an improved waterproof structure. The water pump apparatus includes a pump housing including a washer liquid inlet, a washer liquid outlet, a closed lower portion, an impeller, and a motor configured to rotate the impeller, a terminal cap coupled to an upper portion of the pump housing and forming a waterproof structure, the terminal including a structure for connection to a waterproof connector, and an air vent for communication of an outer space of the terminal cap with an inner space, wherein a membrane member including multiple pores that block water molecules and allow passage of air molecules therethrough is placed in the air vent.

4 Claims, 5 Drawing Sheets

(51) Int. Cl.
  *F04D 13/06* (2006.01)
  *F04D 13/08* (2006.01)
  *B60S 1/48* (2006.01)

(52) U.S. Cl.
  CPC ....... *F04D 29/5806* (2013.01); *F04D 29/708* (2013.01); *B60S 1/481* (2013.01)

(58) Field of Classification Search
  CPC .. F04D 15/0077; F04D 15/0083; F04D 25/06; F04D 29/08; F04D 29/58; F04D 29/5806; F04D 29/586; F04D 29/588; F04D 29/66; F04D 29/70; F04D 29/706; F04D 29/708; F04D 1/00; F04D 13/0693; F04D 29/426; B60J 10/242; B60S 1/0444; B60S 1/46; B60S 1/483; B60S 1/481
  See application file for complete search history.

(56) References Cited

FOREIGN PATENT DOCUMENTS

| | | |
|---|---|---|
| JP | 2004-229495 | 8/2004 |
| KR | 10-2008-0021342 | 3/2008 |
| KR | 10-0811944 | 10/2008 |
| KR | 20-2011-0003846 | 4/2011 |
| KR | 10-2013-0055117 | 5/2013 |
| KR | 10-1267494 | 5/2013 |

OTHER PUBLICATIONS

Korean Intellectual Property Office, Notice of Allowance, dated May 19, 2015, issued in Korea Patent Application No. 10-2014-0162600.

\* cited by examiner

WASHER PUMP APPARATUS FOR VEHICLE PROVIDED WITH IMPROVED WATER-PROOF STRUCTURE

CROSS-REFERENCE TO RELATED APPLICATION

This application claims the benefit of Korean Patent Application No. 10-2014-0162600, filed on Nov. 20, 2014, in the Korean Intellectual Property Office, the disclosure of which is incorporated herein in its entirety by reference.

BACKGROUND

1. Field

One or more exemplary embodiments relate to a washer pump apparatus for a vehicle, in which a washing liquid for washing the windshield glass of the vehicle is injected.

2. Description of the Related Art

Generally, in a vehicle, wipers that can move to the left and right on the windshield glass are mounted to secure a forward field of view for a driver, and a washer nozzle for facilitating a movement of a wiper blade and achieving effective washing is mounted on a hood outer panel to ejecting a washer liquid onto the windshield glass. An apparatus for ejecting the washer liquid includes a washer liquid tank that stores a washer liquid, a washer pump apparatus that pumps the washer liquid in the washer liquid tank, and a washer nozzle that ejects the washer liquid supplied from the washer liquid pump on the windshield glass.

The washer pump apparatus includes an upper motor and a lower pump that are connected to a rotation shaft. An impeller connected to a motor shaft is provided in a pump housing, and the washer liquid introduced from the washer liquid tank through an inlet by rotation of the impeller due to a motor driving force is pumped to the washer nozzle through an outlet of the pump housing.

An example of a washer pump apparatus is disclosed in Korean Patent Registration No. 1267494. The washer pump apparatus disclosed in this patent registration includes a motor, a pump housing having an impeller installed therein, and a terminal cover including an element for supplying power to the motor. The disclosed washer pump apparatus is installed in an engine room that may be exposed to moisture, and thus, it is necessary to prevent moisture from entering the motor or an electrical device installed in the pump housing. Moreover, since heat generated by the motor or an electrical device needs to be dissipated, a structure for introducing external air should be provided.

However, the structure disclosed in this patent registration has an air passage for heat cooling from a lower side of the pump housing to an upper side of the pump housing. Thus, under poor conditions, moisture is likely to enter the motor through the air passage.

SUMMARY

One or more exemplary embodiments include a washer pump apparatus for a vehicle, the washer pump apparatus having an improved structure to substantially block introduction of moisture into an electrical device and to effectively cool heat generated by a motor.

Additional aspects will be set forth in part in the description which follows and, in part, will be apparent from the description, or may be learned by practice of the presented embodiments.

According to one or more exemplary embodiments, an washer pump apparatus for a vehicle, which has an improved waterproof structure, includes a pump housing, a terminal cap, and an air vent for communication of an outer space of the terminal cap with an inner space. The pump housing includes a washer liquid inlet, a washer liquid outlet, a closed lower portion, an impeller, and a motor configured to rotate the impeller. The terminal cap is coupled to an upper portion of the pump housing and forms a waterproof structure, and the terminal cap has a structure for connection to a waterproof connector. A membrane member including multiple pores that block water molecules and allow passage of air molecules therethrough is placed in the air vent. The air vent is on a top surface of the terminal cap, and a roof structure is formed above the air vent, the roof structure being formed integrally with the terminal cap.

The washer pump apparatus may further include a waterproof protrusion protruding upward from the top surface of the terminal cap in an edge of the air vent.

The washer pump apparatus may further include a guide member under the membrane member, the guide member preventing the membrane member from moving downwards.

The washer pump apparatus may further include a noise filter on a top surface of the pump housing, the noise filter removing noise caused by an electrical current supplied to the motor, in which the terminal cap accommodates the noise filter, a waterproof O-ring is between the pump housing and the terminal cap, and the terminal cap is fixed to the pump housing via an elastic hook structure.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
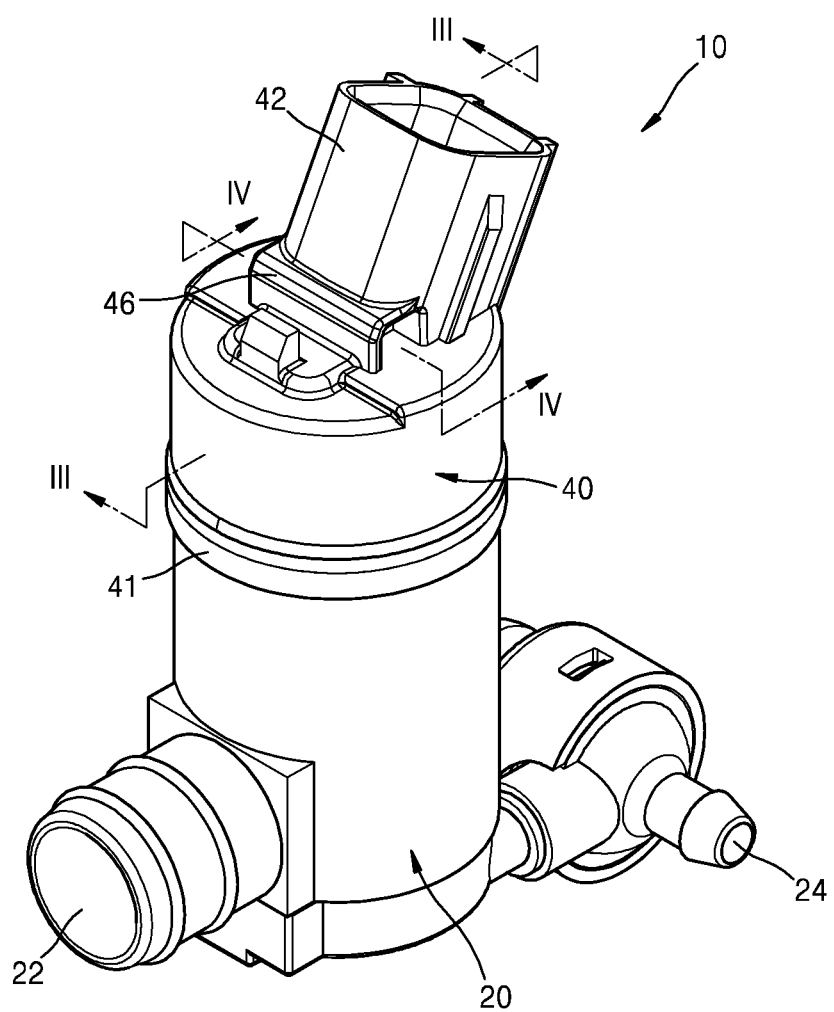
FIG. 1 is a perspective view of a washer pump apparatus for a vehicle, according to an embodiment of the present disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the exemplary embodiments are merely described below, by referring to the figures, to explain aspects of the present description.

Hereinafter, embodiments of the present disclosure will be described with reference to the accompanying drawings.

Figure 2:
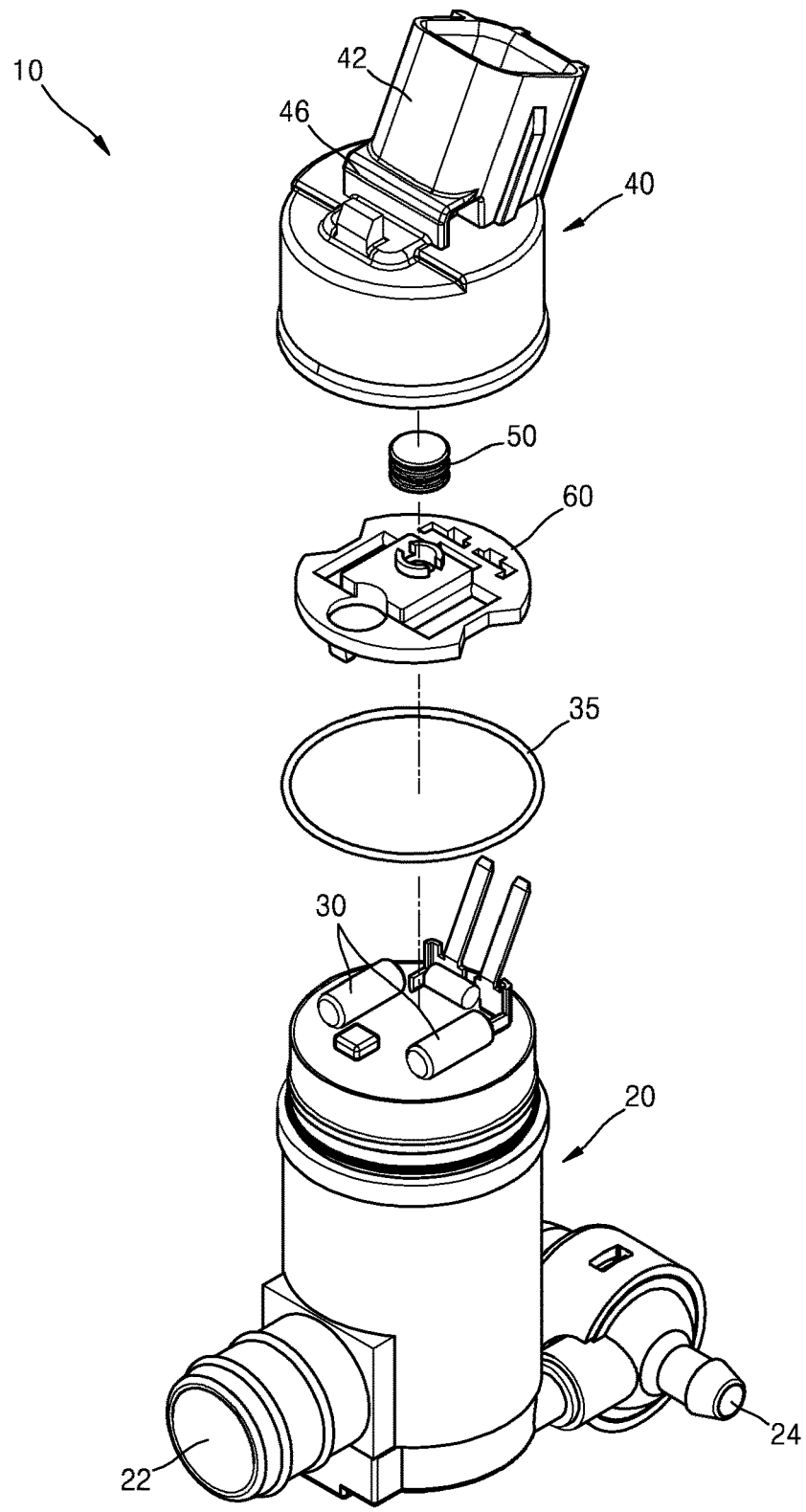
FIG. 2 is an exploded perspective view of the washer pump apparatus for a vehicle shown in FIG. 1, according to an embodiment of the present disclosure.
Figure 3:
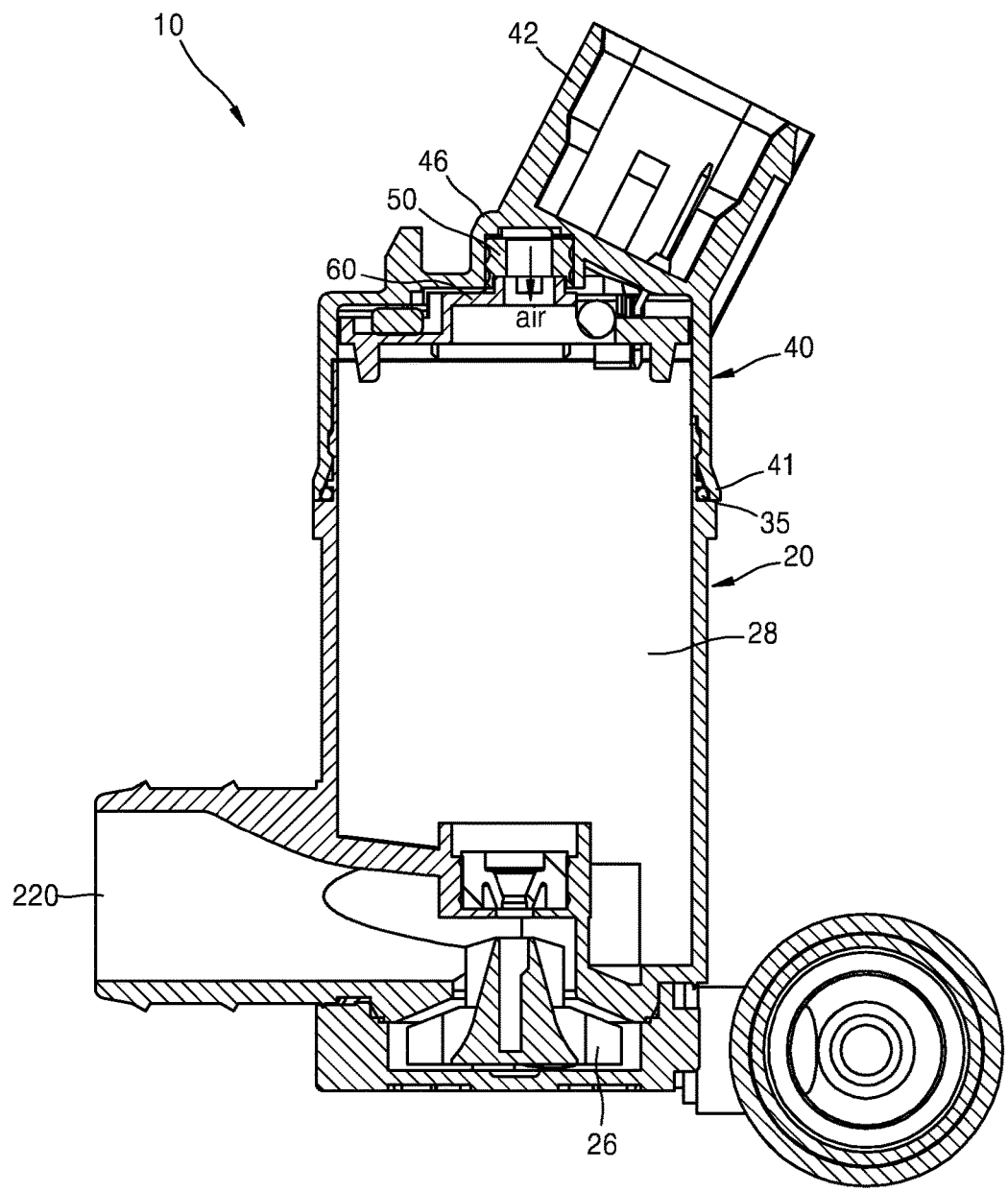
FIG. 3 is a cross-sectional view of the washer pump apparatus taken along a line III-III shown in FIG. 1.
Figure 4:
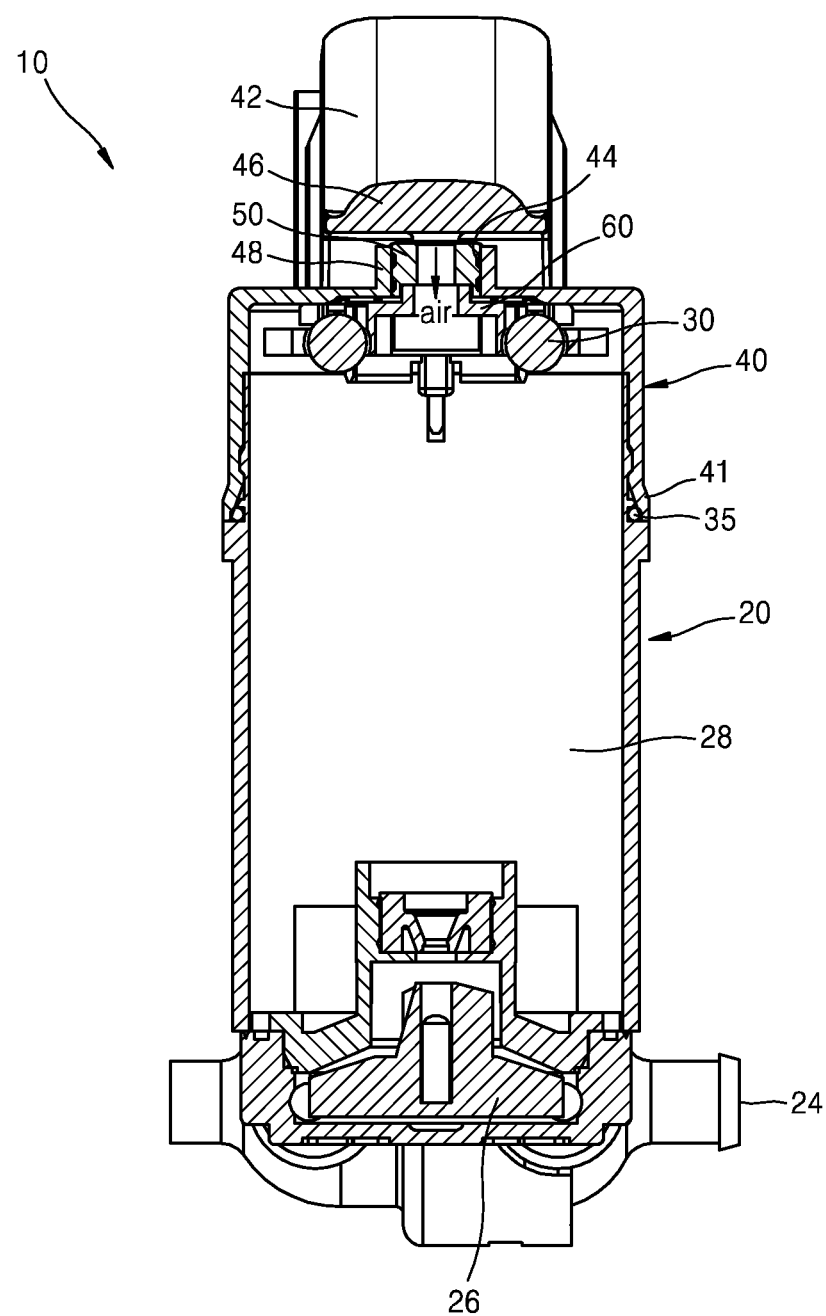
FIG. 4 is a cross-sectional view of the washer pump apparatus taken along a line IV-IV shown in FIG. 1, according to an embodiment of the present disclosure.
Figure 5:
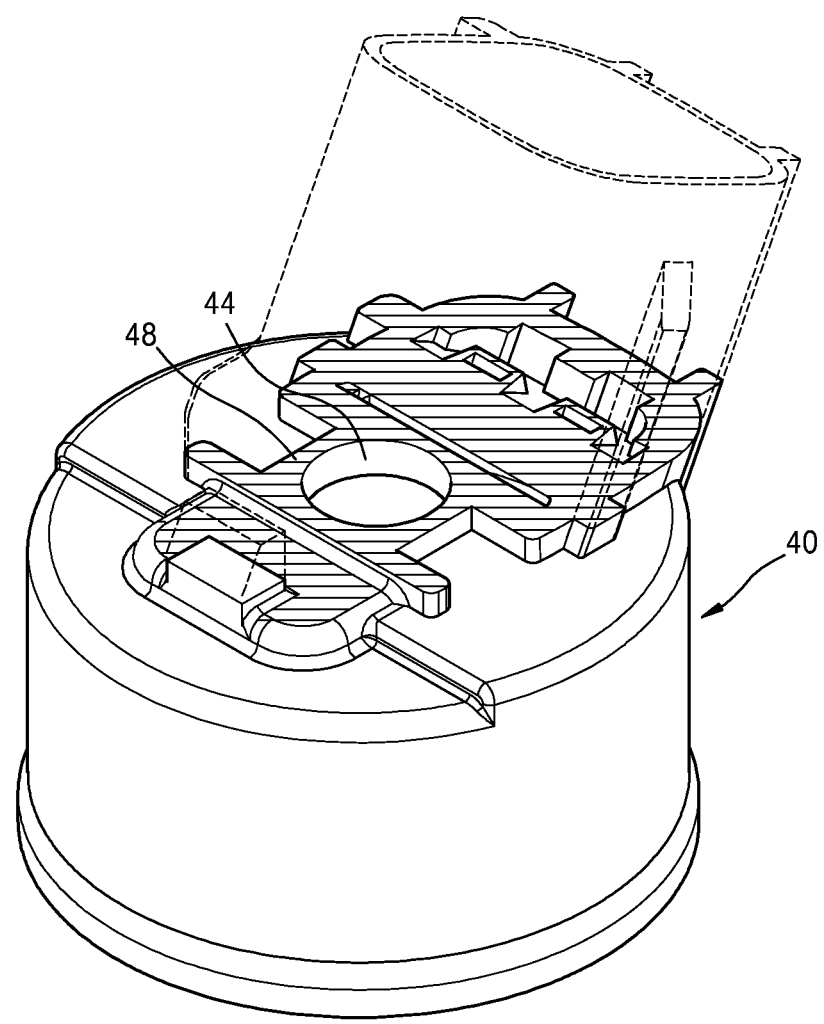
FIG. 5 is a partial cross-sectional view showing a three-dimensional structure of an air vent shown in FIGS. 3 and 4, according to an embodiment of the present disclosure.

FIG. 1 is a perspective view of a washer pump apparatus for a vehicle according to an embodiment of the present disclosure. FIG. 2 is an exploded perspective view of the washer pump apparatus shown in FIG. 1. FIG. 3 is a cross-sectional view taken along a line III-III shown in FIG. 1. FIG. 4 is a cross-sectional view taken along a line IV-IV shown in FIG. 1. FIG. 5 is a partial cross-sectional view of a three-dimensional structure of an air vent shown in FIG. 4.

Referring to FIGS. 1 through 5, a washer pump apparatus for a vehicle, which has an improved waterproof structure, according to an embodiment of the present disclosure (which will be referred to as a "washer pump apparatus 10") may include a pump housing 20, a noise filter 30, a terminal cap 40, an air vent 44, a membrane member 50, an O-ring 35, and a guide member 60.

The pump housing 20 is manufactured, for example, by injection-molding a synthetic resin material. The pump housing 20 may include a washer liquid inlet 22 and a washer liquid outlet 24. The pump housing 20 has a closed lower portion. Thus, introduction of moisture or air through the lower portion of the pump housing 20 may not be possible. A side portion of the pump housing 20 is closed except for at the washer liquid inlet 22 and the washer liquid outlet 24. As a result, waterproof performance inside the pump housing 20 may be improved when compared to a conventional structure. The pump housing 20 may include a space in which an impeller 26 is installed. The impeller 26 is installed rotatably with respect to the pump housing 20. The impeller 26 is installed in the space communicating with the washer liquid inlet 22 and the washer liquid outlet 24. A motor 28 is installed inside the pump housing 20. The motor 28 is fixed to the pump housing 20. A rotation shaft of the motor 28 is connected to a rotation shaft of the impeller 26. Thus, the motor 28 rotates the impeller 26. The space where the impeller 26 is installed and a space where the motor 28 is installed are partitioned from each other, and the partitioned spaces are configured to prevent a washer liquid in the space where the impeller 26 is driven from being introduced to the space where the motor 28 is installed, by using a means such as an O-ring. A top surface of the pump housing 20 may include a hole or may be open so as to be electrically connected with the motor 28 through it.

The noise filter 30 is on the top surface of the pump housing 20. The noise filter 30 removes noise of an electric current applied to the motor 28. An element such as an ElectroMagnetic Compatibility (EMC) filter of a coil type may be used as the noise filter 30.

The terminal cap 40 covers the top surface of the pump housing 20. The terminal cap 40 receives the noise filter 30. A waterproof connector connection portion 42 electrically connected to the noise filter 30 is provided above the terminal cap 40. Although having an open space, the waterproof connector connection portion 42 is physically closed because of a waterproof connector (not shown) connected thereto. Thus, introduction of air or moisture through the water connector connection portion 42 may not be possible. The waterproof connector connected to the waterproof connector connection portion 42 uses a conventional structure and thus will not be described in detail. The terminal cap 40 is coupled to the pump housing 20. For example, a lower portion of the terminal cap 40 may be open. An elastic hook 41 formed on a sidewall of the terminal cap 40 presses the pump housing 20 and is locked in the pump housing 20, such that the terminal cap 40 is fixed to the pump housing 20.

The O-ring 35 is installed between the pump housing 20 and the terminal cap 40. The O-ring 35 tightly covers a gap formed between the pump housing 20 and the terminal cap 40. The O-ring 35 prevents moisture or air from being introduced through a portion where the terminal cap 40 and the pump housing 20 are coupled to each other.

The terminal cap 40 may be forcedly inserted into the pump housing 20. In this case, the terminal cap 40 and the pump housing 20 may be coupled as a waterproof structure, without the O-ring 35.

The terminal cap 40 may include the air vent 44.

The air vent 44 allows communication between the outside of the terminal cap 40 and the inside of the terminal cap 40. For example, the air vent 44 may be formed on a top surface of the terminal cap 40. A roof structure 46 may be formed above the air vent 44. The roof structure 46 prevents moisture from directly accessing the air vent 44 from top, without tightly covering the air vent 44. A waterproof protrusion 48 in the form of a wall protruding upward from the top surface of the terminal cap 40 is provided on an edge of the air vent 44. The waterproof protrusion 48 prevents an access of moisture from a side of the air vent 44. In the air vent 44, the membrane member 50 is installed.

The membrane member 50 may include a Fluor resin membrane structure having one or more small and dense pores called Gore-Tex. Thus, water molecules may not pass through the membrane member 50. The membrane member 50 is one of components implementing a key effect of the present disclosure.

The membrane member 50 is forcedly inserted into a sidewall of the air vent 44. The membrane member 50 may be formed in the shape of a hat having no brim. To prevent the membrane member 50 from unexpectedly moving down from the air vent 44, the guide member 60 is disposed under the membrane member 50. The guide member 60 is disposed to support a bottom surface of the membrane member 50. The guide member 60 receives the noise filter 30 in a lower portion thereof to prevent movement of the noise filter 30. The guide member 60 is disposed in a sandwich form between the membrane member 50 and the noise filter 30. The lower portion of the guide member 60 may be supported by the top surface of the pump housing 20.

Hereinafter, an operation effect of the washer pump apparatus 10 including the above-described elements will be described.

Generally, the washer pump apparatus 10 is installed in an engine room of a vehicle. The washer pump apparatus 10 is fixed in a washer liquid reserve tank (not shown). The waterproof connector (not shown) is connected to the waterproof connector connection portion 42 of the washer pump apparatus 10, and a driver operates an operation switch in the interior of the vehicle. Once the operation switch operates, an electric current is supplied to the noise filter 30 from a battery or a power generator installed in the vehicle through the waterproof connector. The noise filter 30 removes electromagnetic noise from an input electric current to provide an electric current having a phase to the motor 28. As the motor 28 rotates, the impeller 26 also rotates. As the impeller 26 rotates, the washer liquid from the washer liquid reserve tank comes in through the washer liquid inlet 22 and goes out through the washer liquid outlet 24. The washer liquid going out through the washer liquid outlet 24 is injected to windshield glass from an injection nozzle (not shown) installed on a lower end of the windshield glass through a hose.

In this process, heat is generated in an electrical device such as the motor 28 or the noise filter 30. To cool the heat, air needs to be introduced into the washer pump apparatus 10 from outside. The external air is introduced through the air vent 44. The external air introduced through the air vent 44 may pass through the membrane member 50 and arrive at the noise filter 30 or the motor 28. Heat-exchanged inner air passes through the membrane member 50 and goes out of the washer pump apparatus 10 through the air vent 44. In this way, the heat generated inside the washer pump apparatus 10 is cooled.

A periphery of the washer pump apparatus 10 is exposed to the exterior of the vehicle. Thus, the washer pump apparatus 10 may be exposed to moisture like in a rainy environment or vehicle-washing environment. In such an environment, since the pump housing 20 has the closed lower portion, introduction of moisture into the pump housing 20 from the lower portion may be fundamentally prevented. Moreover, introduction of moisture through the gap between the pump housing 20 and the terminal cap 40 may be prevented by the O-ring 35. Introduction of moisture through the waterproof connector connection portion 42 may be prevented by coupling the waterproof connector (not shown) to the waterproof connector connection portion 42. Introduction of moisture through the air vent 44 may be prevented by the membrane member 50. As in an embodiment of the present disclosure, the roof structure 46 provided above the air vent 44 and the waterproof protrusion 48 installed on the side of the air vent 44 prevent moisture from accessing the air vent 44, thereby further reducing the possibility of moisture introduction through the air vent 44.

In addition, the guide member 60 firmly supports the membrane member 50 installed in the air vent 44, preventing the membrane member 50 from moving down from the air vent 44 and thus assisting an waterproof effect. The guide member 60 suppresses movement of the noise filter 30 while supporting the membrane member 50.

As is apparent from the foregoing description, the washer pump apparatus for a vehicle according to the present disclosure includes the pump housing having a closed lower portion, thus fundamentally preventing introduction of moisture into the pump housing from the lower portion of the pump housing. Moreover, to cool heat generated in an electrical device installed in the pump housing, an external air may be introduced through the membrane member installed in the air vent provided in the terminal cap, and moisture may not pass through the membrane member, securing a waterproof function.

In addition, the washer pump apparatus according to the present disclosure does not employ an ultrasonic fusion structure for coupling between the pump housing and the terminal cap unlike in a conventional structure, thereby improving productivity.

Moreover, the washer pump apparatus according to the present disclosure does not need to include a dual-wall structure for the pumping housing like in a conventional structure, so as to provide an air passage in the pump housing, thus simplifying a structure and thus reducing a manufacturing cost and improving productivity.

Although the waterproof protrusion in the form of a wall protruding upward from the top surface of the terminal cap is provided on an edge of the air vent in the foregoing embodiment, the key effect of the present disclosure may be accomplished even when the waterproof protrusion is not provided.

Although the guide member is disposed under the membrane member to prevent the membrane member from unexpectedly moving down from the air vent in the foregoing embodiment of the present disclosure, the key effect of the present disclosure may be accomplished even when the guide member is not provided.

Although the noise filter on the top surface of the pump housing removes noise of an electric current applied to the motor, the terminal cap receives the noise filter, the waterproof O-ring is between the pump housing and the terminal cap, and the terminal cap is fixed to the pump housing using an elastic hook structure in the foregoing embodiment of the present disclosure, the key effect of the present disclosure may be accomplished even when the noise filter, the waterproof O-ring, and the elastic hook structure are not provided.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. A washer pump apparatus for a vehicle, the washer pump apparatus having an improved waterproof structure and comprising:
   a pump housing comprising a top surface, a washer liquid inlet, a washer liquid outlet, a closed lower portion, an impeller, and a motor configured to rotate the impeller;
   a terminal cap coupled to an upper portion of the pump housing and forming a waterproof structure, the terminal cap having a top surface and a structure for connection to a waterproof connector; and
   an air vent for communication of an outer space of the terminal cap with an inner space,
   wherein a membrane member comprising multiple pores that block water molecules and allow passage of air molecules therethrough is placed in the air vent,
   the air vent is on the top surface of the terminal cap,
   a roof structure is formed above the air vent, the roof structure being formed integrally with the terminal cap,
   the washer pump apparatus further comprises a noise filter on the top surface of the pump housing, the noise filter removing noise caused by an electrical current supplied to the motor,
   the terminal cap accommodates the noise filter, and
   a waterproof O-ring is between the pump housing and the terminal cap.

2. The washer pump apparatus of claim 1, further comprising a waterproof protrusion protruding upward from the top surface of the terminal cap in an edge of the air vent.

3. The washer pump apparatus of claim 1, further comprising a guide member under the membrane member, the guide member preventing the membrane member from moving downwards.

4. The washer pump apparatus of claim 1, wherein the terminal cap is fixed to the pump housing via an elastic hook structure.

* * * * *